United States Patent
Masuda

(10) Patent No.: US 8,763,255 B2
(45) Date of Patent: Jul. 1, 2014

(54) MANUFACTURING METHOD FOR WHEEL ROLLING BEARING DEVICE, AND WHEEL ROLLING BEARING DEVICE

(75) Inventor: Yoshinori Masuda, Toyota (JP)

(73) Assignee: Jtekt Corporation, Osaka (JP)

( * ) Notice: Subject to any disclaimer, the term of this patent is extended or adjusted under 35 U.S.C. 154(b) by 64 days.

(21) Appl. No.: 13/401,003

(22) Filed: Feb. 21, 2012

(65) Prior Publication Data

US 2012/0230624 A1 Sep. 13, 2012

(30) Foreign Application Priority Data

Mar. 7, 2011 (JP) ................................. 2011-048894
Dec. 19, 2011 (JP) ................................. 2011-276811

(51) Int. Cl.
*B23P 19/04* (2006.01)
*F16C 19/08* (2006.01)

(52) U.S. Cl.
USPC ............ 29/898.061; 29/432; 29/505; 29/509

(58) Field of Classification Search
USPC ............ 29/444, 502, 512, 894.321, 894.361, 29/894.362, 898.06, 898.062, 898.066, 29/898.07; 384/114, 129, 138, 139; 74/537

See application file for complete search history.

(56) References Cited

U.S. PATENT DOCUMENTS

| | | | |
|---|---|---|---|
| 4,958,944 A | | 9/1990 | Hofmann et al. |
| 5,215,387 A | * | 6/1993 | Bertetti et al. ................ 384/544 |
| 5,263,238 A | | 11/1993 | Cooper |
| 6,857,835 B2 | * | 2/2005 | Wang et al. .................... 411/204 |
| 2005/0198805 A1 | * | 9/2005 | Komori et al. .................. 29/451 |
| 2006/0117903 A1 | | 6/2006 | Kobayashi et al. |
| 2010/0011582 A1 | * | 1/2010 | Kobayashi et al. ...... 29/898.066 |
| 2010/0210369 A1 | * | 8/2010 | Masuda et al. ................ 464/179 |

FOREIGN PATENT DOCUMENTS

| | | |
|---|---|---|
| DE | 39 02 141 A1 | 8/1990 |
| JP | A-2006-111070 | 4/2006 |
| JP | A-2007-268690 | 10/2007 |

OTHER PUBLICATIONS

Jul. 13, 2012 Search Report issued in European Application No. 12158042.7.

* cited by examiner

*Primary Examiner* — Alexander P Taousakis
*Assistant Examiner* — Lee A Holly
(74) *Attorney, Agent, or Firm* — Oliff PLC

(57) ABSTRACT

An outer ring and rolling elements are fitted to a shaft portion of a shaft member for a wheel rolling bearing device from a shaft end portion of the shaft member, an inner ring and rolling elements are fitted to the shaft portion, and then the shaft end portion is clinched to form a clinched portion to thereby fix the inner ring. At this time, the shaft end portion to be clinched has a solid columnar shape, and a clinching jig is pressed against the shaft end portion, and the clinching jig is oscillated while being pressed in a direction toward one end side of the shaft portion to thereby increase the diameter of the shaft end portion to clinch the shaft end portion.

4 Claims, 7 Drawing Sheets

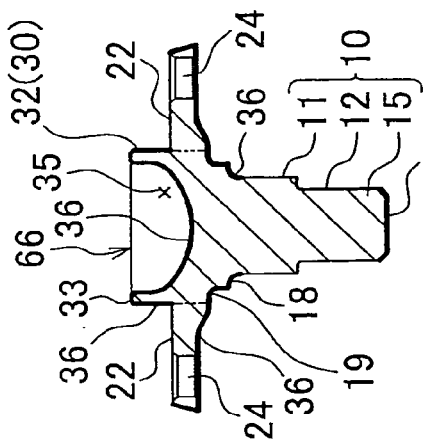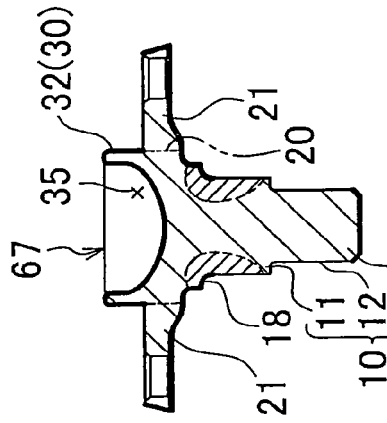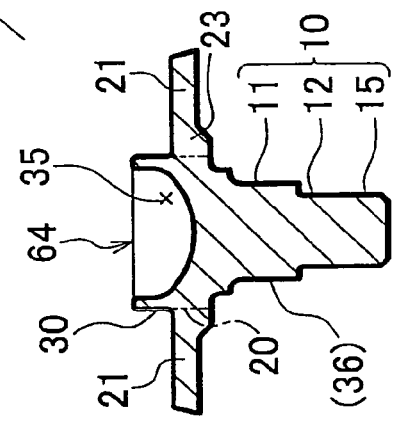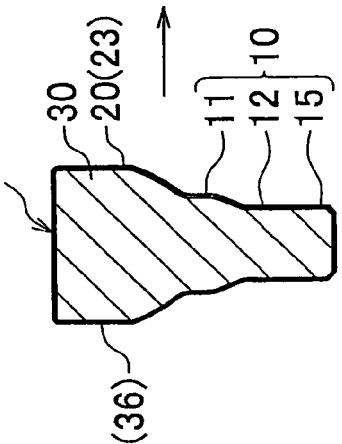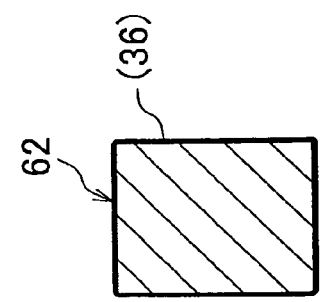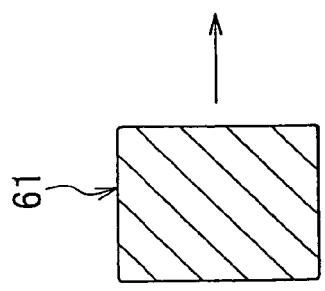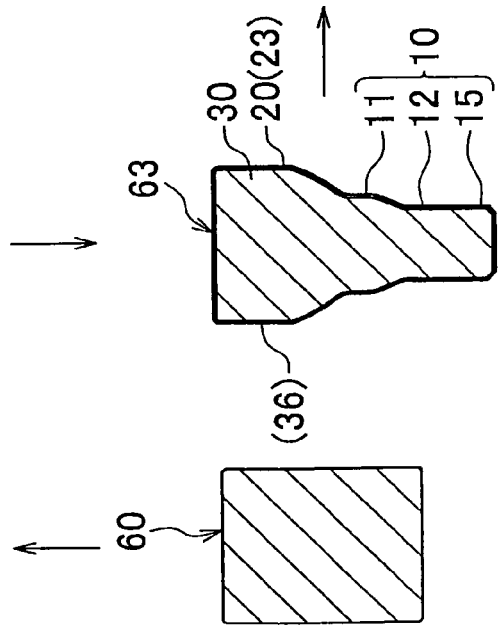

US 8,763,255 B2

MANUFACTURING METHOD FOR WHEEL ROLLING BEARING DEVICE, AND WHEEL ROLLING BEARING DEVICE

INCORPORATION BY REFERENCE

The disclosure of Japanese Patent Application No. 2011-048894 filed on Mar. 7, 2011 and Japanese Patent Application No. 2011-276811 filed on Dec. 19, 2011 including the specification, drawings and abstract, is incorporated herein by reference in its entirety.

BACKGROUND OF THE INVENTION

1. Field of the Invention

The invention relates to a manufacturing method for a wheel rolling bearing device, and a wheel rolling bearing device.

2. Description of Related Art

A wheel rolling bearing device (so-called "wheel hub unit") and a manufacturing method for the wheel rolling bearing device are described in, for example, Japanese Patent Application Publication No. 2006-111070 (JP 2006-111070 A) and Japanese Patent Application Publication No. 2007-268690 (JP 2007-268690 A). In a manufacturing method for an existing wheel rolling bearing device 101 shown in FIG. 7A, described in JP 2006-111070 A, a shaft member 106 (having a fitting shaft portion 109, flanges 107 and a shaft portion 105) for a wheel rolling bearing device is formed as a single-piece member through cold forging, and a hollow cylindrical portion 115 (indicated by the dotted line) that will be a clinched portion 117 used to fix an inner ring 142 is formed at one end of the shaft portion 105. Then, after the inner ring 142 is fitted to the cylindrical portion 115, the cylindrical portion 115 is clinched radially outward to form the clinched portion 117 to thereby fix the inner ring 142. In addition, in an existing wheel rolling bearing device 201 shown in FIG. 7B, described in JP 2007-268690 A, a hollow cylindrical portion 215 (indicated by the dotted line) that will be a clinched portion 217 used to fix an inner ring 242 is formed by turning at one end of a shaft member 206 for a wheel rolling bearing device. Then, after the inner ring 242 is fitted to the cylindrical portion 215, the cylindrical portion 215 is clinched radially outward to form the clinched portion 217 to thereby fix the inner ring 242.

In the related art described in JP 2006-111070 A, the cylindrical portion 115 to which the inner ring 142 is fitted is formed through cold forward extrusion, and a die needs to have a shape corresponding to the cylindrical portion. Therefore, the shape of the die is slightly complex. In addition, in the related art described in JP 2007-268690 A, the cylindrical portion 215 to which the inner ring 242 is fitted is formed through turning. Therefore, extra equipment, time and costs are required for turning. In addition, the clinched portion 117 (see FIG. 7A) in JP 2006-111070 A and the clinched portion 217 (see FIG. 7B) in JP 2007-268690 A each are formed by clinching the cylindrical portion. Therefore, the center portion of the clinched portion is hollow, and the stiffness of the clinched portion is low.

SUMMARY OF THE INVENTION

An object of the invention is to provide a manufacturing method for a wheel rolling bearing device, which makes it possible to further efficiently manufacture a wheel rolling bearing device with a simpler die and further improve the stiffness of a clinched portion for an inner ring fitted to one end of a shaft portion, and the wheel rolling bearing device.

An aspect of the invention relates to a manufacturing method for a wheel rolling bearing device that includes a shaft member that has: a shaft portion that has an outer peripheral surface on which a first inner ring raceway surface is formed; a fitting shaft portion formed on one end side of the shaft portion so as to be coaxial with the shaft portion; and a flange located between the shaft portion and the fitting shaft portion so as to extend radially outward. The shaft portion is formed in a solid columnar shape. The first inner ring raceway surface is formed on a portion of the outer peripheral surface of the shaft portion, which is in proximity to the flange. An outer ring, which has an inner peripheral surface on which a first outer ring raceway surface and a second outer ring raceway surface are formed, is fitted to the shaft portion, and a plurality of first rolling elements is disposed between the first inner ring raceway surface and the first outer ring raceway surface. An inner ring, which has an outer peripheral surface on which a second inner ring raceway surface is formed, is fitted to the shaft portion, and a plurality of second rolling elements is disposed between the second inner ring raceway surface and the second outer ring raceway surface. Then, a clinching jig is pressed against an end portion of the shaft portion that has a solid columnar shape, that is at the other end side of the shaft portion, and that protrudes from the inner ring, and the clinching jig is oscillated while the clinching jig is pressed toward the one end side of the shaft portion. In this way, a diameter of the end portion of the shaft portion is increased to clinch the end portion of the shaft portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A to FIG. 5G are views that show changes, and the like, of the shape of a workpiece through the processes shown in FIG. 5A to FIG. 5G, from a columnar workpiece to a molded shaft member for a wheel rolling bearing device;

DETAILED DESCRIPTION OF EMBODIMENTS

Figure 1:
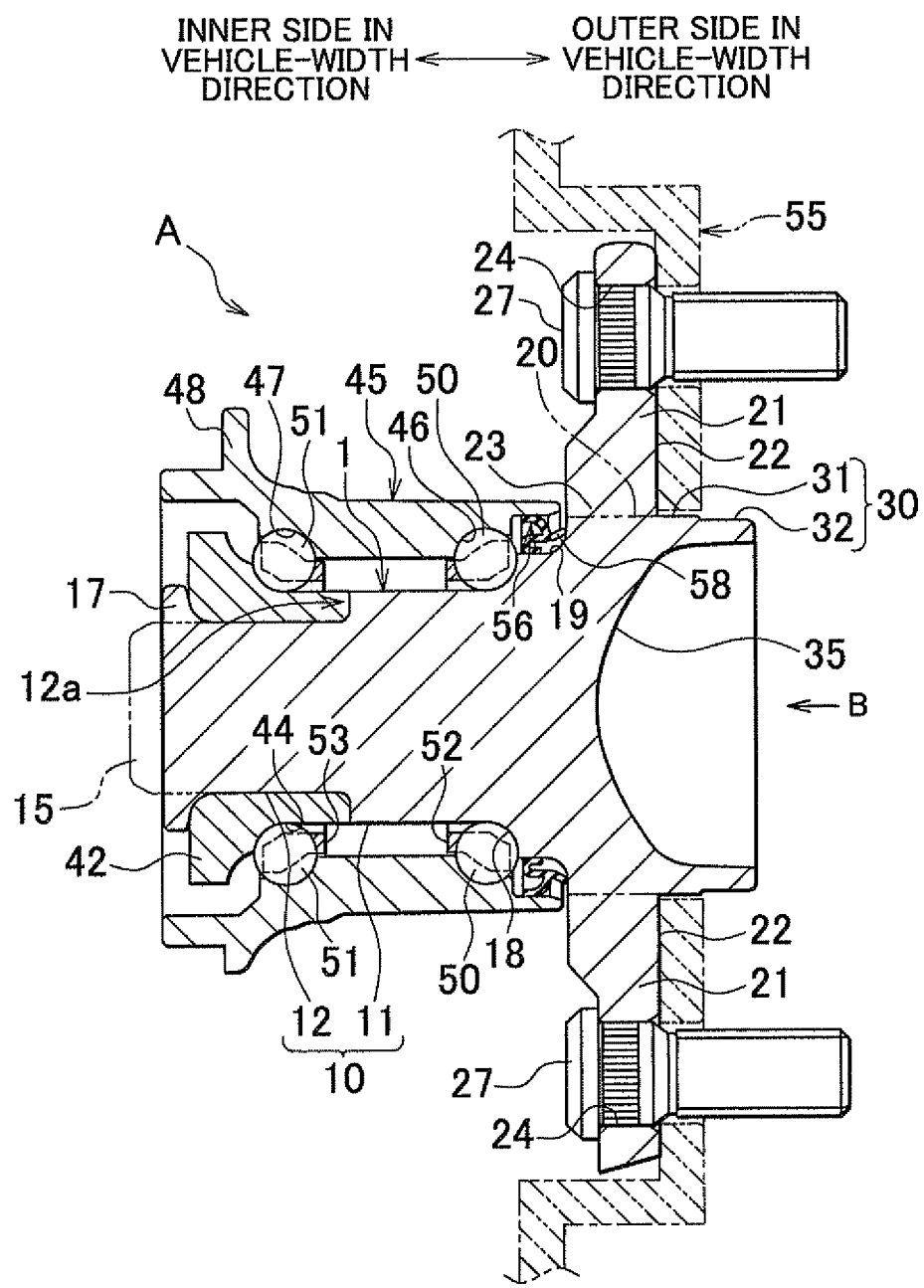
FIG. 1 is an axial sectional view that shows a state where a shaft member for a wheel rolling bearing device, manufactured by a manufacturing method for a wheel rolling bearing device according to an embodiment of the invention, is assembled in a wheel rolling bearing device.

Hereinafter, an embodiment of the invention will be described with reference to the accompanying drawings. FIG. 1 shows an axial sectional view of a wheel rolling bearing device A manufactured by a manufacturing method for a wheel rolling bearing device according to the embodiment of the invention.

The overall structure of the wheel rolling bearing device A will be described with reference to FIG. 1, As shown in FIG. 1, the wheel rolling bearing device A (so-called "wheel hub unit") is formed of a shaft member 1, an outer ring 45, an inner ring 42, first rolling elements 50, second rolling elements 51, and the like. The shaft member 1 (so-called hub wheel) has a shaft portion 10, a fitting shaft portion 30, a flange base portion 20 and a plurality of flanges 21 that are all formed from a single-piece material. Note that, when the wheel rolling bearing device A is mounted on a vehicle, the shaft portion 10 is located on the inner side of the fitting shaft portion 30 in the vehicle-width direction, and the fitting shaft portion 30 is located on the outer side of the shaft portion 10 in the vehicle-width direction. In FIG. 1, the left side of the sheet indicates the inner side in the vehicle-width direction and the right side of the sheet indicates the outer side in the vehicle-width direction.

Figure 2:
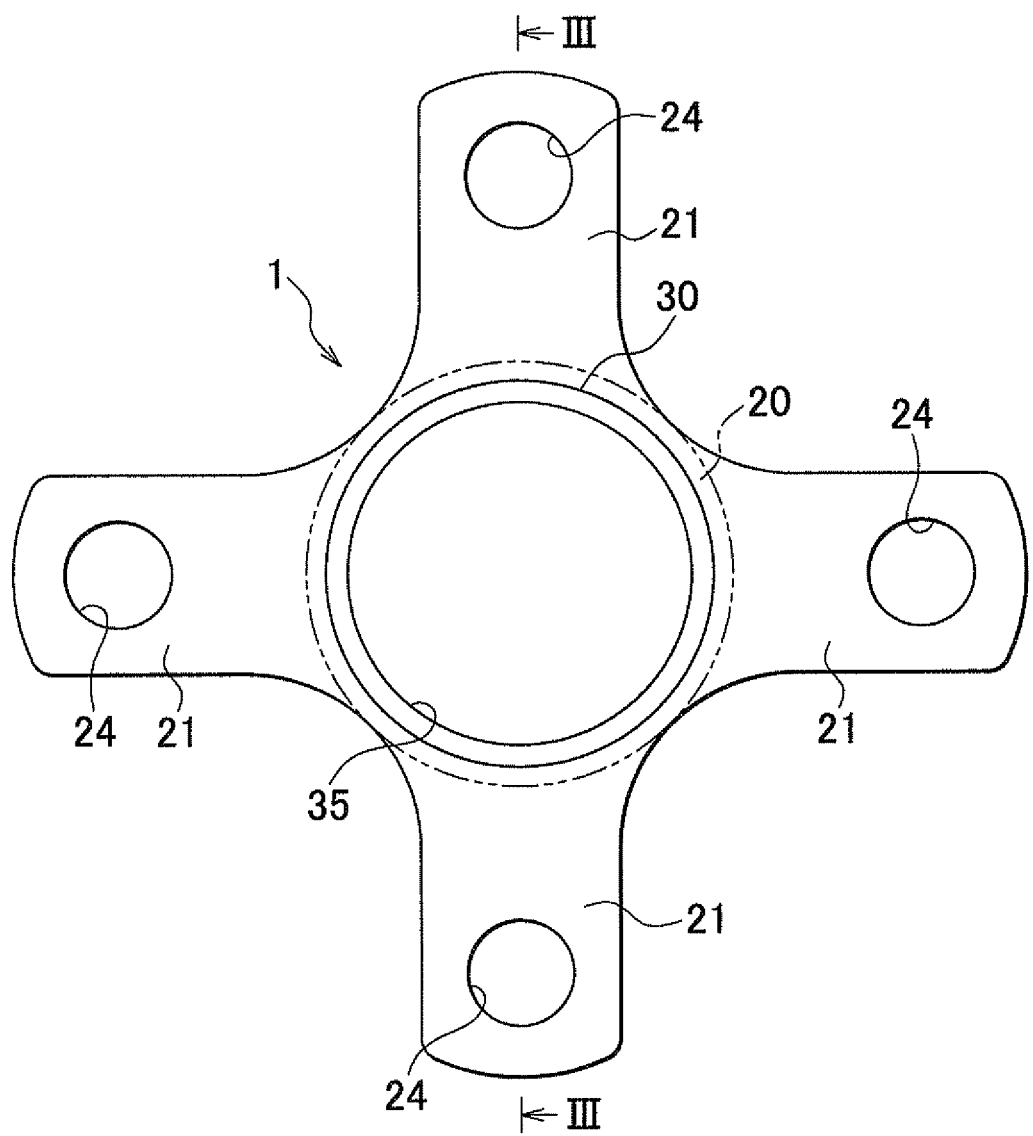
FIG. 2 is a view of the shaft member for a wheel rolling bearing device shown in FIG. 1 when viewed in the direction indicated by the arrow B (hub bolts are not shown)
Figure 3:
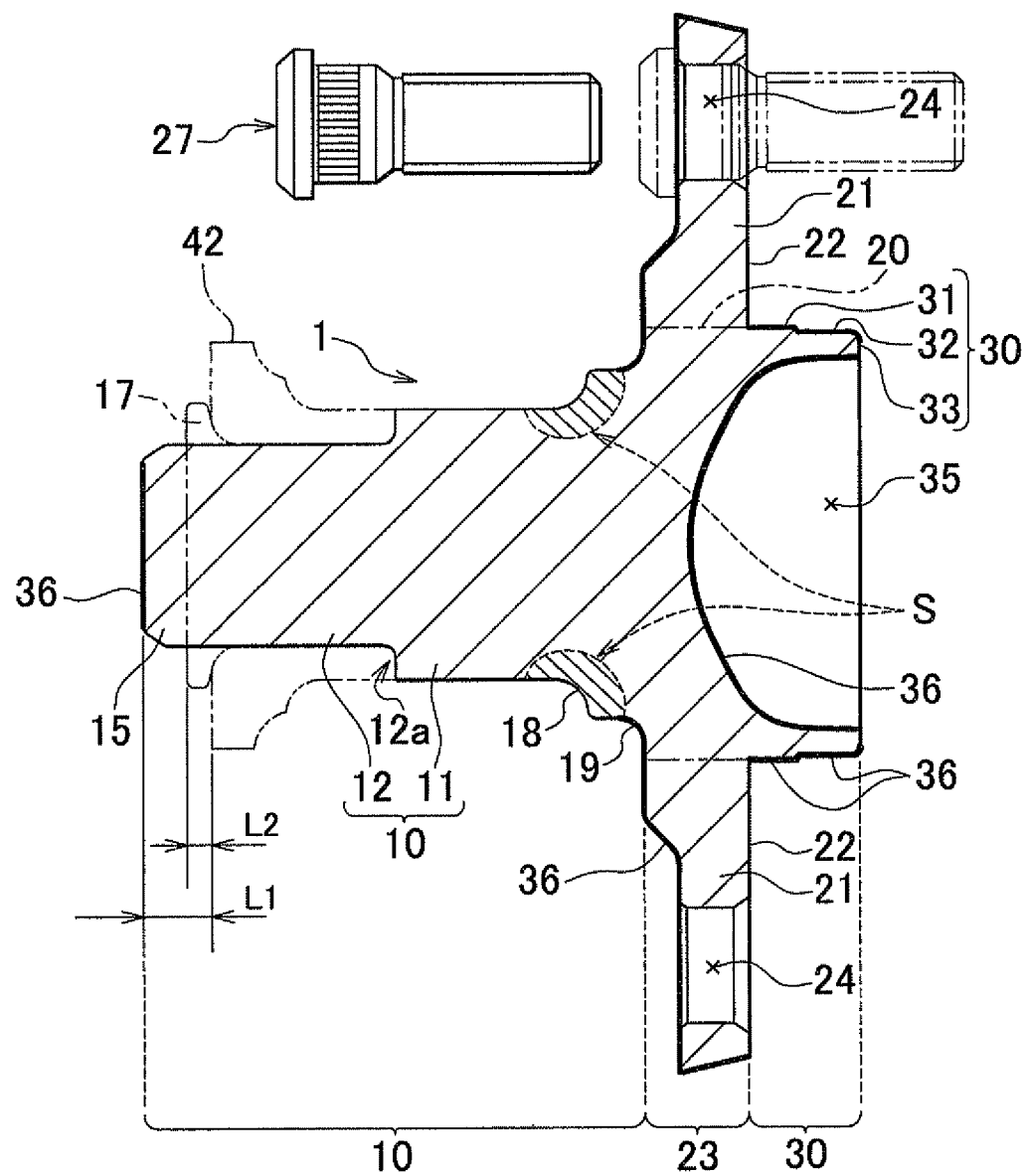
FIG. 3 is an axial sectional view of the shaft member for a wheel rolling bearing device.

The shaft portion 10 has a substantially columnar shape. The shaft portion 10 has a large-diameter shaft portion 11 and a small-diameter shaft portion 12. The large-diameter shaft portion 11 and the small-diameter shaft portion 12 are formed on the opposite side of the shaft member 1 from the fitting shaft portion 30. The large-diameter shaft portion 11 having a large diameter is formed near the flanges 21. The small-diameter shaft portion 12 having a diameter smaller than that of the large-diameter portion 11 is formed at an end portion of the shaft portion 10, which is distant from the flanges 21. In addition, an inner ring contact surface 12a is formed at the step between the large-diameter shaft portion 11 and the small-diameter shaft portion 12. The inner ring contact surface 12a is perpendicular to the rotation axis of the shaft portion 10. The flange base portion 20 is located between the shaft portion 10 and the fitting shaft portion 30 (described later). The flanges 21 (see FIG. 2) are formed on the outer peripheral surface of the flange base portion 20 so as to extend radially outward in a radial fashion. The flanges 21 respectively have bolt holes 24. Hub bolts 27 that fasten a wheel are respectively press-fitted and arranged in the bolt holes 24. The fitting shaft portion 30 is formed in a substantially cylindrical shape on one end side (on the opposite side of shaft portion 10 from the small-diameter shaft portion 12) of the shaft portion 10 so as to be contiguous and coaxially with the shaft portion 10. The fitting shaft portion 30 is fitted to the center hole of the wheel (not shown). The fitting shaft portion 30 has a brake rotor fitting portion 31, on the flange 21-side, and a wheel fitting portion 32 on the distal end side. The wheel fitting portion 32 is slightly smaller in diameter than the brake rotor fitting portion 31. As shown in FIG. 1, the surface around the center hole of a brake rotor 55 contacts rotor support surfaces 22 that are surfaces of the flanges 21, which are on the fitting shaft portion 30-side. As shown in FIG. 3, the shaft member 1 for a wheel rolling bearing device has the fitting shaft portion 30, an intermediate shaft portion 23 and the shaft portion 10 that are formed coaxially along the direction of the rotation axis. Note that the intermediate shaft portion 23 includes the flange base portion 20 and the flanges 21. A forged recess 35 is formed at the radially inner side of the fitting shaft portion 30.

A first inner ring raceway surface 18 is formed on a part of the outer peripheral surface of the large-diameter shaft portion 11, which is in proximity to the boundary with the flanges 21 (flange base portion 20), so as to be continuous in the circumferential direction. The first inner ring raceway surface 18 constitutes one of bearing portions of a double row angular contact ball bearing that serves as a rolling bearing. A sealing surface 19 (described later) is formed on a part of the outer peripheral surface, which is next to the first inner ring raceway surface 18 which is close to the flanges 21, so as to be continuous in the circumferential direction. The inner ring 42 is fitted to the outer peripheral surface of the small-diameter shaft portion 12. In the outer peripheral surface of the inner ring 42, a second inner ring raceway surface 44 is formed so as to be continuous in the circumferential direction. Note that the inner ring 42 is fitted to the small-diameter shaft portion 12 until the inner ring 42 comes into contact with the inner ring contact surface 12a. A protruded portion (shaft end portion 15 in FIG. 1) of the small-diameter shaft portion 12, which protrudes from the inner ring 42, is clinched radially outward to form a clinched portion 17. The inner ring 42 is fixed by the clinched portion 17 and the inner ring contact surface 12a.

An outer ring 45 is arranged around the outer peripheral surface of the shaft portion 10 of the shaft member 1 with an annular space left between the outer ring 45 and the shaft portion 10. A first outer ring raceway surface 46 and a second outer ring raceway surface 47 are formed on the inner peripheral surface of the outer ring 45. The first outer ring raceway surface 46 faces the first inner ring raceway surface 18 formed in the shaft member 1. The second outer ring raceway surface 47 faces the second inner ring raceway surface 44 formed in the inner ring 42. The inner ring raceway surfaces and the outer ring raceway surfaces are formed on the respective surfaces so as to be continuous in the circumferential direction. The first rolling elements 50 are disposed between the first inner ring raceway surface 18 and the first outer ring raceway surface 46, and are rollably retained by a cage 52. The second rolling elements 51 are disposed between the second inner ring raceway surface 44 and the second outer ring raceway surface 47, and are rollably retained by a cage 53. An axial preload is applied to the first rolling elements 50 and the second rolling elements 51 on the basis of clinching force exerted when the end portion of the small-diameter shaft portion 12 is clinched to form the clinched portion 17. Thus, the angular contact ball bearing is formed.

A vehicle body-side flange 48 is integrally formed with the outer peripheral surface of the outer ring 45. The vehicle body-side flange 48 is fastened to the mounting surface of a vehicle body-side member with bolts, or the like. The vehicle body-side member, such as a knuckle and a carrier, is supported by a suspension device (not shown) of the vehicle. A seal member 56 is press-fitted and fitted to the inner peripheral surface of an opening portion of the outer ring 45, which is next to the first outer ring raceway surface 46. The distal end of a lip 58 of the seal member 56 slidably contacts the sealing surface 19 to thereby seal the gap between the outer ring 45 and the shaft member 1. The sealing surface 19 is formed on a part of the outer peripheral surface, which is next to the first inner ring raceway surface 18 and on the flange 21-side (flange base portion 20-side) so as to be continuous in the circumferential direction.

Figure 4:
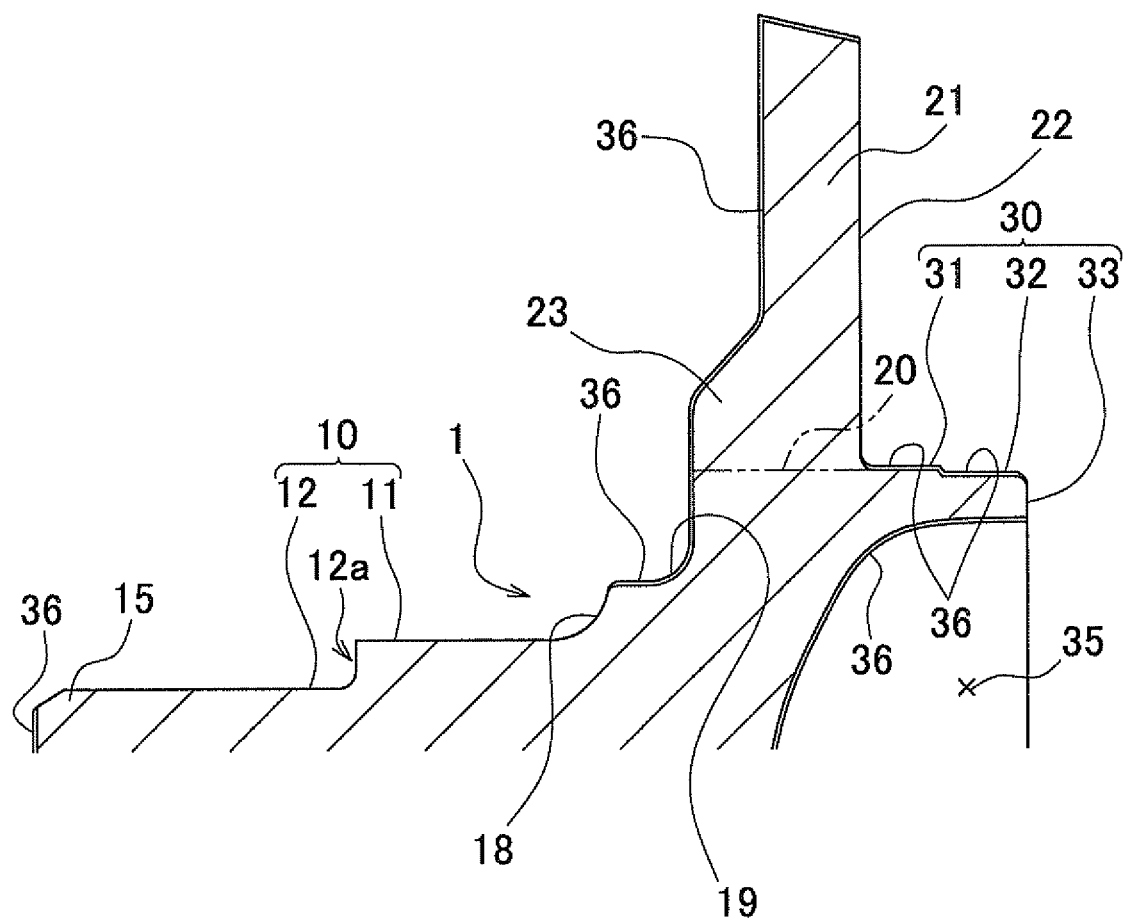
FIG. 4 is an enlarged axial sectional view of the shaft member for a wheel rolling bearing device, showing a shaft portion, one of flanges and a fitting shaft portion.

The structure of the shaft member 1 for a wheel rolling bearing device and a manufacturing method for the wheel rolling bearing device A that includes the shaft member 1 will be described with reference to FIG. 2 to FIG. 4, FIGS. 5A to 5G, and FIGS. 6A to 6D. FIG. 5A to FIG. 5G show a state where the shaft member 1 is molded through the processes from a columnar workpiece 60. FIG. 2 to FIG. 4 show the shape of the molded shaft member 1. FIG. 6A to FIG. 6D show the processes of assembling the wheel rolling bearing device A by fitting the outer ring 45, the inner ring 42, and the like, to the shaft member 1. The method of manufacturing the shaft member 1 will be described with reference to FIG. 5A to FIG. 5G. The shaft member 1, described in the present embodiment, is manufactured through an annealing process, a coating process, a cold forging process, a turning process, a heat treatment process and a grinding process. In advance of the annealing process, a substantially round rod made of carbon steel for machine structure use, having a carbon content of about 0.5%, such as S45C, S50C and S55C, is cut into a predetermined length to form the columnar workpiece 60 (see FIG. 5A).

In the annealing process, the columnar workpiece 60 is heated at a temperature higher than or equal to a transformation temperature (desirably, a temperature higher by about 20° C. to 70° C. than the transformation temperature). The carbon component of the columnar workpiece 60 is spheroidized in the annealing process, and the columnar workpiece 60 is subjected to spheroidizing annealing to form an annealed columnar workpiece 61 (see FIG. 5B). The annealed columnar workpiece 61 has a higher ductility than that of the non-annealed columnar workpiece 60.

In the coating process, the surface of the annealed columnar workpiece 61 is coated with lubricant to form a coated columnar workpiece 62 having a lubricant coating 36 (see FIG. 5C). For example, a phosphate that serves as a lubricant is applied on the surface of the annealed columnar workpiece 61 to form the coated columnar workpiece 62 having the lubricant coating (phosphate coating) 36. The friction force, generated between a molding die for cold forging and a workpiece (material), is reduced by the lubricant coating 36 formed on the surface of the coated columnar workpiece 62. In this way, the coated columnar workpiece 62 that has been subjected to the above-described annealing process and coating process has an improved ductility and a reduced friction against the die. Therefore, the coated columnar workpiece 62 is a workpiece excellent in cold forgeability.

The subsequent cold forging process is formed of a primary cold forging process and a secondary cold forging process. In the primary cold forging process, the coated columnar workpiece 62 is subjected to forward extrusion using a forging die apparatus (not shown) for cold forward extrusion. When the coated columnar workpiece 62 is subjected to the forward extrusion, the outer shapes of the shaft portion 10 (including the large-diameter shaft portion 11, the small-diameter shaft portion 12 and the shaft end portion 15), intermediate shaft portion (the flange base portion 20 and a part of the fitting shaft portion 30) 23 and fitting shaft portion 30 are formed. Thus, a primary cold forged piece 63 is manufactured through cold forward extrusion (see FIG. 5D).

In the secondary cold forging process, the primary cold forged piece 63 is subjected to lateral extrusion using a forging die apparatus (not shown) for cold lateral extrusion. When the primary cold forged piece 63 is subjected to the lateral extrusion, the flanges 21 are formed, in a radial fashion, on the outer peripheral surface of the intermediate shaft portion 23 (flange base portion 20) located between the shaft portion 10 and the fitting shaft portion 30 while the forged recess 35 is formed at the center portion on the end surface of the fitting shaft portion 30 of the primary cold forged piece 63. Thus, a secondary cold forged piece 64 (see FIG. 5E) is manufactured. The small-diameter shaft portion 12 of the shaft portion 10 formed through the above-described primary cold forging process and secondary cold forging process has a solid columnar shape. Therefore, it is possible to use a die having a shape simpler than that when a cylindrical portion is formed through cold forging. In addition, it is possible to more easily carry out cold forging when a sold columnar portion is formed than when a cylindrical portion is formed through cold forging.

In the turning process, a part of the secondary cold forged piece 64, for example, the rotor support surfaces 22, which are one side surfaces of the flanges 21, and an end surface 33 of the fitting shaft portion 30 are turned, and the bolt holes 24 are respectively formed in the flanges 21. Thus, a turned forged piece 66 (see FIG. 5G) is formed. In the turning process, at least the lubricant coating 36 of the wheel fitting portion 32 (see FIG. 4) of the fitting shaft portion 30 of the secondary cold forged piece 64 is left without being turned. In addition, in the present embodiment, as shown in FIG. 3 and FIG. 4, the lubricant coating 36 is also left, without being turned, on the surfaces of the flanges 21, which are on the opposite side of the rotor support surfaces 22, the sealing surface 19 formed to be contiguous with the shoulder of the first inner ring raceway surface 18, the surface of the forged recess 35 and the end surface of the shaft end portion 15 at the distal end of the small-diameter shaft portion 12 of the shaft portion 10. Therefore, a turning area is reduced by the amount of the remaining lubricant coating 36. As a result, turning becomes easier and takes a shorter period of time. Note that, in the related art, in the turning process, the shaft end portion 15 that is clinched to fix the inner ring 42 is perforated to form a pilot hole by a drill, or the like, and then the inner periphery of the pilot hole is finished by a turning machine to be formed in a cylindrical shape. However, in the wheel rolling bearing device A described in the present embodiment, the shaft end portion 15 may be formed in a solid columnar shape. Thus, it is possible to reduce equipment, time and costs in comparison with the related art. In addition, the lubricant coating 36 is also left on the end surface of the shaft end portion 15 at the distal end of the small-diameter shaft portion 12 without being turned. Therefore, in the clinching process (described later) as well, friction force against a clinching jig is reduced, and clinching is carried out more easily.

In the heat treatment process (hardening and tempering process), the first inner ring raceway surface 18 of the shaft portion 10 of the turned forged piece 66 is subjected to induction hardening and is then tempered to form a heat-treated forged piece 67 (see FIG. 5G). In this case, the sealing surface 19, the outer peripheral surface of the small-diameter shaft portion 12 and the inner ring contact surface 12a are not subjected to induction hardening (see FIG. 3). Thus, it is possible to reduce a period of time for the heat treatment process. Note that, as shown in FIG. 3, a quench-hardened layer S resulting from hardening and tempering is formed around the first inner ring raceway surface 18. In the present embodiment, the carbon steel for machine structure use, having a relatively high carbon content and a high hardness is used. Therefore, it is possible to ensure a required strength even when the boundary portion between the shaft portion 10 and the flanges 21 (flange base portion 20), which is the outer periphery of the sealing surface 19, is not subjected to induction hardening. In addition, as shown in FIG. 1, the area of the inner ring contact surface 12a is set (the strength increases as the area increases) such that the inner ring contact surface 12a has sufficient strength by which the inner ring 42 is fixed reliably by the inner ring contact surface 12a and the clinched portion 17 formed by clinching the shaft end portion 15 of the small-diameter shaft portion 12.

In the grinding process, the first inner ring raceway surface 18 of the heat-treated forged piece 67 is ground to form the shaft member 1 (see FIG. 3 and FIG. 4).

Next, a method of manufacturing (assembling) the wheel rolling bearing device A that includes the shaft member 1 for a wheel rolling bearing device, manufactured in the above processes, will be described with reference to FIG. 6A to FIG. 6D. Note that FIG. 6A to FIG. 6D show a state after the hub bolts 27 are press-fitted to the shaft member 1. Alternatively, the processes shown in FIG. 6A to FIG. 6D may be carried out before the hub bolts 27 are press-fitted to the shaft member 1. In the manufacturing method described below, the wheel rolling bearing device A is manufactured through an outer ring fitting process, an inner ring fitting process and a clinching process.

In the outer ring fitting process, the outer ring 45 that has the first rolling elements 50 (provided with the cage 52) and the seal member 56 is fitted to the shaft portion 10 from the shaft end portion 15 (the end portion of the small-diameter shaft portion 12) of the shaft member 1, which has been subjected to the above described grinding process. When the outer ring 45 is fitted to the shaft portion 10, the first rolling elements 50 are rollably retained between the first inner ring raceway surface 18 formed on the outer peripheral surface of the large-diameter shaft portion 11 and the first outer ring raceway surface 46 formed on the inner peripheral surface of the outer ring 45.

In the inner ring fitting process, the inner ring 42 that has the second rolling elements 51 (provided with the cage 53) is fitted to the shaft portion 10 from the shaft end portion 15 of the shaft member 1, which has been subjected to the above described outer ring fitting process a position, until the inner ring 42 contacts the inner ring contact surface 12a. When the inner ring 42 is fitted to the shaft portion 10, the second rolling elements 51 are rollably retained between the second inner ring raceway surface 44 formed on the outer peripheral surface of the inner ring 42 and the second outer ring raceway surface 47 formed on the inner peripheral surface of the outer ring 45.

Figure 6A:
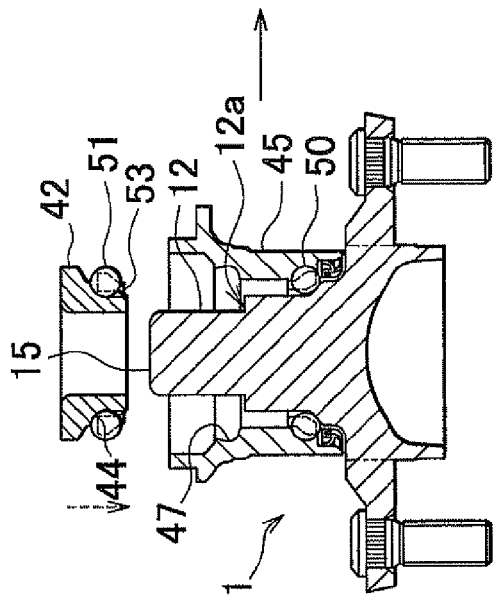
FIG. 6A is a view that illustrates the process of fitting an outer ring and first rolling elements to the molded shaft member for a wheel rolling bearing device.
Figure 6B:
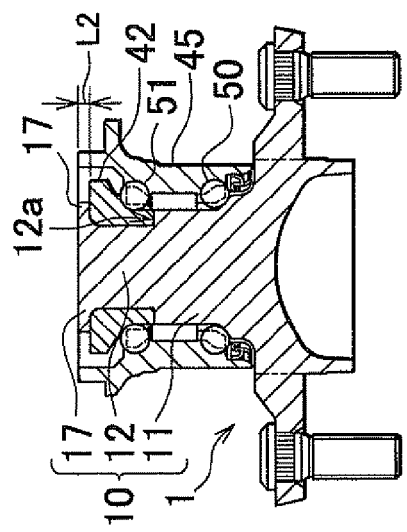
FIG. 6B is a view that illustrates the process of fitting second rolling elements to an inner ring.
Figure 6C:
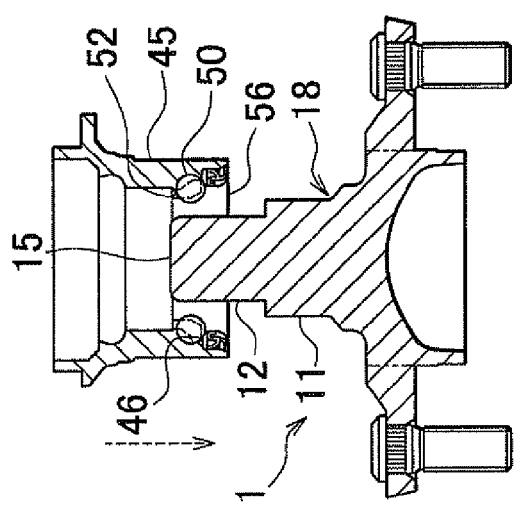
FIG. 6C is a view that illustrates the process of clinching a shaft end portion.
Figure 6D:
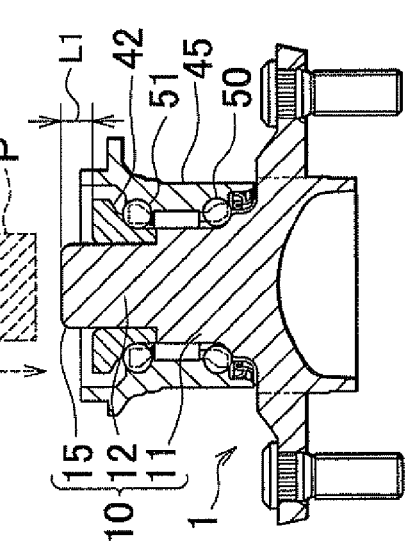
FIG. 6D is a view that illustrates the assembled wheel rolling bearing device.
Figure 7A:
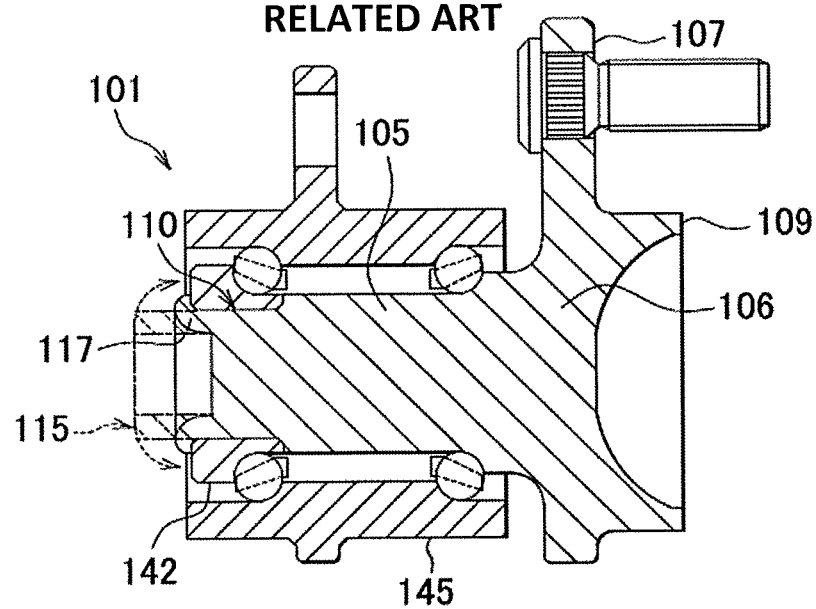
FIG. 7A is an axial sectional view of an existing wheel rolling bearing device (first comparative example)
Figure 7B:
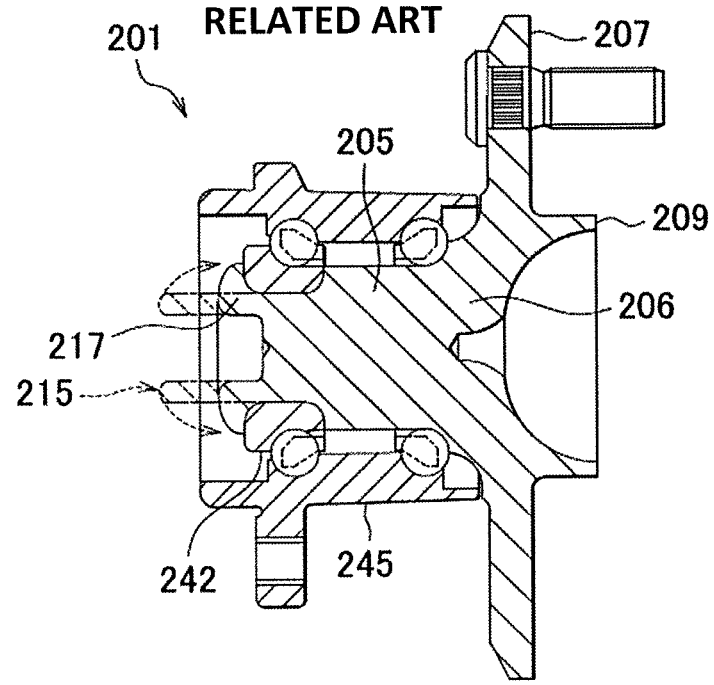
FIG. 7B is an axial sectional view of an existing wheel rolling bearing device (second comparative example).

In the clinching process, a clinching jig P is pressed against the shaft end portion 15 of the shaft member 1, which has been subjected to the above described inner ring fitting process, along the direction of the rotation axis of the shaft portion 10, and the clinching jig P is oscillated to plastically deform the shaft end portion 15 such that the diameter of the shaft end portion 15 is increased radially outward, and, after that, the oscillation is stopped and pressing force is kept for a predetermined period of time. Thus, the clinched portion 17 is formed. Thus, the end surface (surface perpendicular to the rotation axis of the shaft portion 10) of the clinched portion 17 becomes a planar shape. The shape of the clinching jig P is, for example, a columnar shape, and the clinching surface of the clinching jig P, which contacts the shaft end portion 15, has a planar shape as shown in FIG. 6C. Note that the shape of the clinching jig P is not limited to the columnar shape having a planar clinching surface, and clinching jigs P having various shapes may be used. In the above described turning process, the lubricant coating 36 is left on the end surface of the shaft end portion 15 at the distal end of the small-diameter shaft portion 12 without being turned. Therefore, friction force against the clinching jig P is reduced, and clinching is more easily carried out. The pressing force [N] at the time of clinching is desirably set so as to satisfy Equation 1 below in order to prevent buckling (deformation) of the inner ring 42 and the inner ring contact surface 12a.

Pressing Force [N]≤Area of Inner Ring Contact Surface [mm$^2$]*500 [N/mm$^2$]     Equation 1

As shown in FIG. 3, the protruded length L1 by which the shaft end portion 15 (small-diameter shaft portion 12) protrudes from the inner ring 42 before clinching is a preset length. Clinching is carried out such that the ratio (L2/L1) of the protruded length L2 by which the shaft end portion 15 protrudes from the inner ring 42 after clinching to the protruded length L1 by which the shaft end portion 15 protrudes from the inner ring 42 before clinching is from 35% to 65%. Thus, the wheel rolling bearing device A is obtained. Note that the end surface of the clinched portion 17 has a planar shape and the clinched portion 17 has a solid columnar shape before clinching, so the protruded length L1 before clinching is calculated based on the outside diameter of the clinched portion 17 after clinching, the protruded length L2 of the clinched portion 17 after clinching and the diameter of the small-diameter shaft portion 12 (the inside diameter of the inner ring 42) (volume of protruded portion before clinching=volume of protruded portion after clinching). Thus, the ratio (L2/L1) is obtained from the wheel rolling bearing device A after clinching.

In order to achieve the above-described clinching (not clinching a "cylindrical portion" but clinching a "solid columnar portion"), it is desirable to satisfy the following conditions. In order to improve the efficiency of cold rolling by decreasing the hardness of a workpiece, spheroidizing annealing (annealing process) is carried out using a carbon steel having a carbon content of 0.50 to 0.85[%]. In addition, the carbon steel needs to have a carbon content of 0.50 to 0.85[%] in order to be used as the bearing ring. Through the spheroidizing annealing, the ductility of a workpiece improves, which makes it possible to perform cold forging (cold forging process). Because the ductility is improved so that cold forging is possible, the clinching process is easily carried out. By combining the three processes that are spheroidizing annealing process, cold forging process and clinching process with one another, it is possible to easily and efficiently manufacture the wheel rolling bearing device as described below, and it is possible to reduce costs.

In the manufacturing method for a wheel rolling bearing device, described in the present embodiment, the carbon steel for machine structure use, such as S50C and S55C, is heated at a temperature higher than or equal to the transformation temperature to thereby form the annealed columnar workpiece 61 in the annealing process for the shaft member for a wheel rolling bearing device. Then, in the subsequent coating process, the lubricant coating 36 that reduces friction force generated between a molding die for cold forging and the annealed columnar workpiece 61 is applied on the surface of the annealed columnar workpiece 61 to form the coated columnar workpiece 62 to thereby form a workpiece excellent in forgeability. Thus, even when the shaft end portion 15 (small-diameter shaft portion 12) is formed in a solid columnar shape instead of being formed in a hollow cylindrical shape, clinching is easily carried out. Therefore, a die, turning, and the like, for forming the shaft end portion 15 into a hollow cylindrical shape are not required. Thus, it is possible to easily and efficiently manufacture the wheel rolling bearing device, and it is possible to reduce costs. Clinching is carried out such that the ratio (L2/L1) of the protruded length L2 by which the shaft end portion 15 protrudes from the inner ring 42 after clinching to the protruded length L1 by which the shaft end portion 15 protrudes from the inner ring 42 before clinching is from 35% to 65%. In this way, it is possible to reliably prevent a crack of the shaft end portion and to fix the inner ring 42 with an appropriate pressing force (pressing force with which the inner ring 42 is pressed against the inner ring contact surface 12*a*) (a crack easily occurs if the ratio (L2/L1) is smaller than 35%, and the pressing force is insufficient if the ratio (L2/L1) is larger than 65%). Furthermore, the solid columnar portion is clinched and increased in diameter radially outward, and the center portion of the clinched portion is not formed to be hollow. Therefore, it is possible to improve the stiffness of the clinched portion.

A carbon steel for machine structure use, having a relatively high hardness, is used, and the area of the inner ring contact surface 12*a* is appropriately set. Thus, even when only the first inner ring raceway surface 18 of the shaft portion 10 is subjected to heat treatment in the heat treatment process, and the sealing surface 19, the outer peripheral surface of the small-diameter shaft portion 12 and the inner ring contact surface 12*a* are not subjected to heat treatment, it is possible to ensure a necessary strength. Thus, a period of time for the heat treatment process is reduced.

The manufacturing method for a wheel rolling bearing device and the wheel rolling bearing device according to the invention are not limited to the manufacturing method, such as the treatments, the processes, and the like, external appearance, configuration, structure, and the like, described in the present embodiment, and various modifications, additions and omissions are possible without departing from the scope of the invention. The manufacturing method for a wheel rolling bearing device and the wheel rolling bearing device, described in the present embodiment, are described using the example where the shaft portion 10 has the large-diameter shaft portion 11, the small-diameter shaft portion 12 and the inner ring contact surface 12*a*. However, the manufacturing method for a wheel rolling bearing device and the wheel rolling bearing device, described in the present embodiment, may also be applied to a wheel rolling bearing device that includes a shaft portion having no large-diameter shaft portion 11, small-diameter shaft portion 12 or inner ring contact surface 12*a* and a manufacturing method for the wheel rolling bearing device. In addition, numeric values used in the description of the present embodiment are illustrative and not restrictive. The greater-than-or-equal to sign ($\geq$), the less-than-or-equal-to sign ($\leq$), the greater-than sign ($>$), the less-than sign ($<$), and the like, may include an equal sign or may not include an equal sign.

What is claimed is:

1. A manufacturing method for a wheel rolling bearing device that includes a shaft member that has: a shaft portion that has an outer peripheral surface on which a first inner ring raceway surface is formed; a fitting shaft portion formed on one end side of the shaft portion so as to be coaxial with the shaft portion; and a flange located between the shaft portion and the fitting shaft portion so as to extend radially outward, the method comprising:

forming the shaft portion in a solid columnar shape;
   forming the first inner ring raceway surface on a portion of the outer peripheral surface of the shaft portion, which is in proximity to the flange;
   fitting an outer ring, which has an inner peripheral surface on which a first outer ring raceway surface and a second outer ring raceway surface are formed, to the shaft portion, and disposing a plurality of first rolling elements between the first inner ring raceway surface and the first outer ring raceway surface;
   fitting an inner ring, which has an outer peripheral surface on which a second inner ring raceway surface is formed, to the shaft portion, and disposing a plurality of second rolling elements between the second inner ring raceway surface and the second outer ring raceway surface; and
   pressing a clinching jig against an end portion of the shaft portion that has a solid columnar shape, that is at the other end side of the shaft portion, and that protrudes from the inner ring, and oscillating the clinching jig while pressing the clinching jig toward the one end side of the shaft portion to thereby increase a diameter of the end portion of the shaft portion to clinch the end portion of the shaft portion, so as to form the end of the clinched portion into an entirely planar shape.

2. The manufacturing method for a wheel rolling bearing device according to claim 1, wherein
   a columnar workpiece made of carbon steel for machine structure use is subjected to annealing and is then cold-forged to thereby form a cold-forged piece that has the shaft portion, the fitting shaft portion and the flange, and
   after the inner ring is fitted to the shaft portion of the cold-forged piece, the end portion of the shaft portion that has the solid columnar shape, that is at the other end side of the shaft portion, and that protrudes from the inner ring is clinched.

3. The manufacturing method for a wheel rolling bearing device according to claim 1, wherein
   a section of the shaft portion protrudes from the inner ring and is clinched such that a ratio of a length by which the section of the shaft portion protrudes from the inner ring after clinching to a length by which the shaft portion protrudes from the inner ring before clinching is from 35% to 65%.

4. The manufacturing method for a wheel rolling bearing device according to claim 1, wherein a flat surface of the clinching is pressed in a direction that is parallel to the central axis of the end shaft portion.

\* \* \* \* \*